United States Patent
Boler et al.

(10) Patent No.: US 8,844,956 B2
(45) Date of Patent: Sep. 30, 2014

(54) DIRECTIONAL DAMPER FOR HEAVY-DUTY VEHICLE AXLE/SUSPENSION SYSTEMS

(71) Applicant: Hendrickson USA, L.L.C., Itasca, IL (US)

(72) Inventors: Matthew J. Boler, Inverness, IL (US); R. Scott Fulton, Hudson, OH (US); Thomas J. Long, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/153,134

(22) Filed: Jan. 13, 2014

(65) Prior Publication Data

US 2014/0197615 A1 Jul. 17, 2014

Related U.S. Application Data

(60) Provisional application No. 61/753,134, filed on Jan. 16, 2013.

(51) Int. Cl.
*B60G 9/00* (2006.01)
(52) U.S. Cl.
USPC .................................................. 280/124.116
(58) Field of Classification Search
USPC ...................... 280/124.116, 124.11, 124.106, 280/124.107, 124.128, 124.154, 124.157
See application file for complete search history.

(56) References Cited

U.S. PATENT DOCUMENTS

| | | | |
|---|---|---|---|
| 3,330,578 A | 7/1967 | Kress et al. | |
| 3,782,753 A | 1/1974 | Sweet et al. | |
| 4,869,474 A | 9/1989 | Best et al. | |
| 6,389,341 B1 | 5/2002 | Davis | |
| 6,641,152 B1 | 11/2003 | Suzuki | |
| 6,715,744 B2 | 4/2004 | Bell | |
| 7,886,882 B2 | 2/2011 | Behmenburg et al. | |
| 7,900,941 B2 * | 3/2011 | Lundmark | 280/124.106 |
| 8,167,319 B2 | 5/2012 | Ogawa | |

FOREIGN PATENT DOCUMENTS

| | | | | |
|---|---|---|---|---|
| CN | 201931957 U | * | 8/2011 | ............ 280/124.106 |
| JP | 2000143198 A | * | 5/2000 | |
| WO | 9421487 A1 | | 9/1994 | |

* cited by examiner

*Primary Examiner* — Faye M. Fleming
(74) *Attorney, Agent, or Firm* — Dureska, Kennedy & Moore, L.L.C.; David P. Dureska; Brent L. Moore

(57) ABSTRACT

A directional damper for heavy-duty vehicle axle/suspension systems includes damping means disposed at least between the vehicle and a suspension assembly of the vehicle. The damping means provides directional damping to the suspension assembly with respect to a selected datum, such as the beam or the main member of the vehicle.

20 Claims, 13 Drawing Sheets

DIRECTIONAL DAMPER FOR HEAVY-DUTY VEHICLE AXLE/SUSPENSION SYSTEMS

CROSS-REFERENCE TO RELATED APPLICATION

This application claims the benefit of U.S. Provisional Patent Application Ser. No. 61/753,134, filed Jan. 16, 2013.

BACKGROUND OF THE INVENTION

1. Field of the Invention

The invention relates generally to the art of axle/suspension systems for heavy-duty vehicles. More particularly, the invention relates to axle/suspension systems for heavy-duty vehicles, which utilize an air spring or other cushioning means that operates in more than a single plane to cushion the ride of the vehicle. More specifically, the invention is directed to a directional damper for a heavy-duty vehicle axle/suspension system, whereby the directional damper is capable of managing or controlling the direction of damping of the axle/suspension system with respect to a predetermined datum, and that results in optimized damping of the axle/suspension system during operation of the heavy-duty vehicle and improved ride quality for the heavy-duty vehicle.

2. Background Art

The use of air-ride trailing and leading arm rigid beam-type axle/suspension systems has been very popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members, which form the frame of the vehicle. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or other spring mechanism, which in turn is connected to a respective one of the main members. A height control valve is mounted on the main member or other support structure and is operatively connected to the beam and to the air spring in order to maintain the ride height of the vehicle. A brake system and, optionally, one or more shock absorbers for providing damping to the axle/suspension system of the vehicle also are mounted on the axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle as well as certain road conditions, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to have beams that are fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is the air spring, while a shock absorber typically provides damping characteristics to the axle/suspension system.

The typical air spring of the type utilized in heavy-duty air-ride axle/suspension systems includes three main components, a flexible bellows, a piston and a bellows top plate. The bellows is typically formed from rubber or other flexible material, and is operatively mounted on top of the piston. The piston is typically formed from steel, aluminum, fiber reinforced plastics or other rigid material, and is mounted on the rear end of the top plate of the beam of the suspension assembly by fasteners of the type that are generally well known in the art. The volume of pressurized air, or "air volume", that is contained within the air spring is a major factor in determining the spring rate of the air spring. More specifically, this air volume is contained within the bellows and, in some cases, the piston of the air spring. The larger the air volume of the air spring, the lower the spring rate of the air spring. A lower spring rate is generally more desirable in the heavy-duty vehicle industry because it provides a softer ride to the vehicle during operation. Typically, the piston either contains a hollow cavity, which is in communication with the bellows and which adds to the air volume of the air spring by allowing unrestricted communication of air between the piston and the bellows volumes, or the piston has a generally hollow cylindrical-shape and does not communicate with the bellows volume, whereby the piston does not contribute to the air volume of the air spring. The air volume of the air spring is in fluid communication with the height control valve of the vehicle, which in turn is in fluid communication with an air source, such as an air supply tank. The height control valve, by directing air flow into and out of the air spring of the axle/suspension system, helps maintain the desired ride height of the vehicle.

Prior art air springs such as the ones described above, while providing cushioning to the vehicle cargo and occupant(s) during operation of the vehicle, provide little if any damping characteristics to the axle/suspension system. Such damping characteristics are instead typically provided by a pair of hydraulic shock absorbers, although a single shock absorber has also been utilized and is generally well known in the art, as is the use of a plurality of shock absorbers in extra heavy-duty applications. Each one of the shock absorbers is mounted on and extends between the beam of a respective one of the suspension assemblies of the axle/suspension system and a respective one of the main members of the vehicle or to another structure that connects to the main member.

More particularly, a pair of prior art shock absorbers of the type utilized in heavy-duty air-ride axle/suspension systems generally include a cylinder and a piston rod reciprocating within the cylinder. The cylinder is filled with an operating fluid, such as gas or oil, such that the operating fluid is moved by a piston valve secured to one end of the piston rod to generate a damping force.

As set forth above, each one of the prior art shock absorbers is mounted on and extends between the beam of a respective one of the suspension assemblies of the axle/suspension system and a respective one of the main members of the vehicle or other component fixed to the main member, such as the hanger. More particularly, the upper end of the shock absorber is fastened to a clevis-type bracket that is mounted on a wing that extends inboardly from the hanger. The lower end of the shock absorber is rigidly fastened to a mount that extends from the inboard sidewall of the beam of the suspension assembly.

Because prior art shock absorbers are rigidly fastened to mounts that are attached to the vehicle frame and the beam resulting in an angled orientation, these prior art shock absorbers can create fore-aft forces or loads that are transmitted into the suspension assembly of the axle/suspension system during operation of the vehicle and, therefore, do not provide optimal damping to the axle/suspension system. More specifically, the position of the shock absorber on the suspension assembly does not provide optimal damping to the axle/suspension system during operation of the vehicle because the angle of the damping inputs from the shock absorber to the beam and the vehicle frame are not perpendicular to the beam as it rotates. This creates the aforementioned fore-aft loading on the beam of the suspension assembly, which in turn can potentially reduce the effectiveness of the components of the axle/suspension system and/or the shock absorbers. The directional damper of the present invention overcomes the problems associated with the prior art damping shock absorbers, by providing a directional damper that is capable of managing or controlling the overall direction of damping of the axle/suspension system relative to a predetermined datum, and that results in optimized damping of the axle/suspension system during operation of the heavy-duty vehicle, in turn resulting in improved ride quality for the heavy-duty vehicle.

SUMMARY OF THE INVENTION

Objectives of the present invention include providing a directional damper for heavy-duty vehicle axle/suspension systems that provides optimal damping to the suspension assembly of the axle/suspension system.

A further objective of the present invention is to provide a directional damper for heavy-duty vehicle axle/suspension systems that is capable of managing or controlling the overall direction of damping of the axle/suspension system relative to a predetermined datum.

Yet another objective of the present invention is to provide a directional damper for heavy-duty vehicle axle/suspension systems that improves ride quality of the heavy-duty vehicle.

These objectives and advantages are obtained by the directional damper for heavy-duty vehicle axle/suspension systems of the present invention, which includes a damping means disposed between a frame of the vehicle and a suspension assembly of the axle/suspension system of the vehicle for providing directional damping to the suspension assembly with respect to a selected datum.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
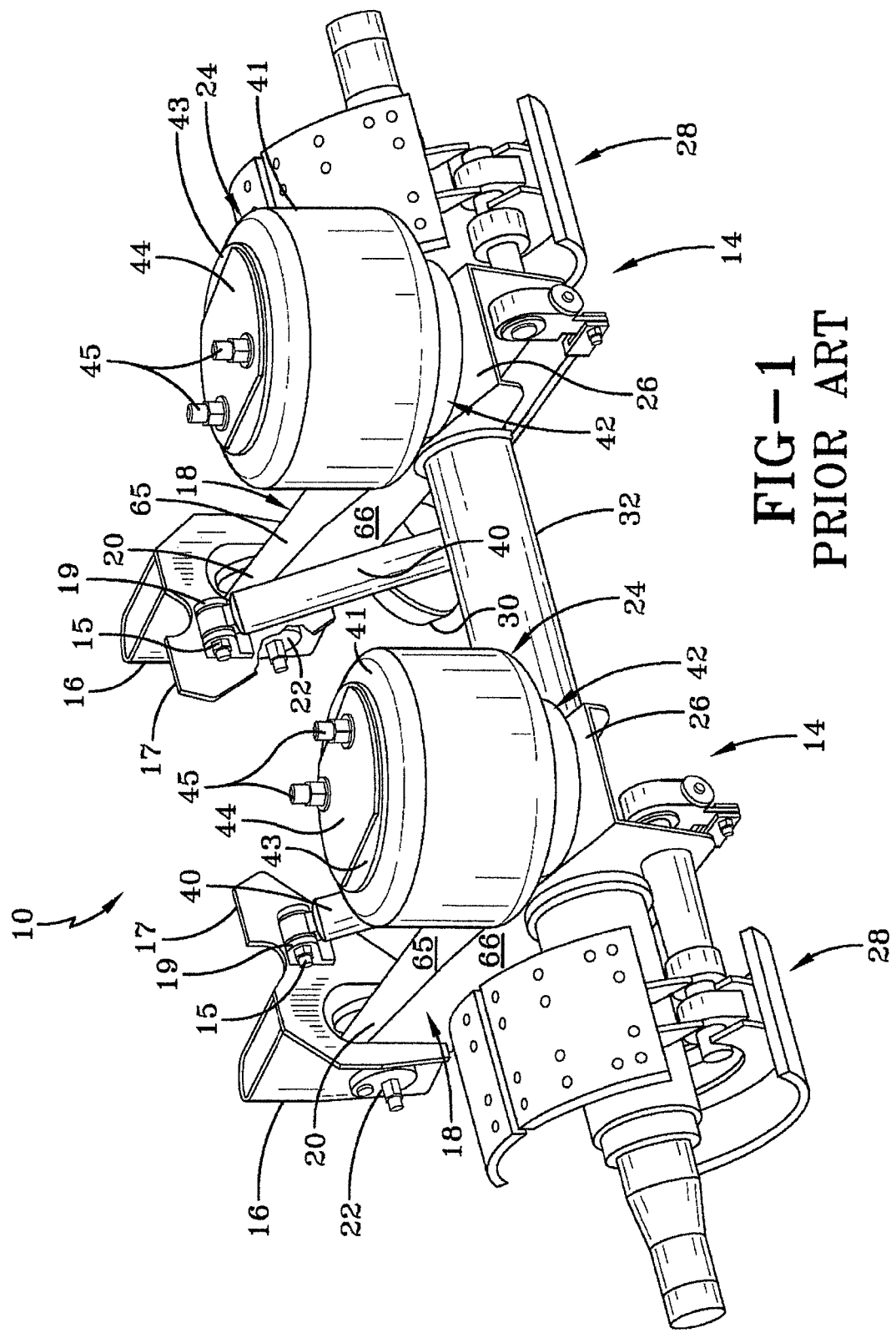
FIG. 1 is a top rear perspective view of an axle/suspension system incorporating a pair of prior art shock absorbers, and showing a pair air springs, with each one of the pair of shock absorbers mounted on a respective one of the hangers and suspension assemblies of the axle/suspension system.

In order to better understand the environment in which the directional damper for heavy-duty vehicle axle/suspension systems of the present invention is utilized, a trailing arm overslung beam-type air-ride axle/suspension system that incorporates a prior art shock absorber 40, is indicated generally at reference numeral 10, is shown in FIG. 1, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate (not shown) extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely extending axle 32.

Suspension assembly 14 also includes an air spring 24, mounted on and extending between beam rear end 26 and the main member (not shown). Air spring 24 includes a bellows 41 and a piston 42. The top portion of bellows 41 is sealingly engaged with a bellows top plate 43. An air spring mounting plate 44 is mounted on top plate 43 by fasteners 45, which are also used to mount the top portion of air spring 24 to the vehicle main member (not shown). Piston 42 is generally cylindrically shaped and has a generally flat bottom plate and top plate (not shown). The bottom portion of bellows 41 is sealingly engaged with piston top plate (not shown). The piston bottom plate is attached to beam top plate 65 at beam rear end 26 via a pedestal (not shown), which is attached to the beam top plate and the piston bottom plate in a manner well known to those having skill in the art, such as by bolts or other fasteners (not shown). The piston top plate is formed without openings so that there is no fluid communication between piston 42 and bellows 41. The top end of a shock absorber 40 is mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 including a brake chamber 30 is shown mounted on prior art suspension assembly 14.

Because prior art shock absorber 40 is pivotally fastened to rigid mounts that are attached to hanger wing 17 and beam 18, the shock absorber creates fore-aft forces or loads that are transmitted into suspension assembly 14 of axle/suspension system 10 during operation of the vehicle and, therefore, does not provide optimal damping to the axle/suspension system because of the angular orientation of the shock absorber relative to the beam of the axle/suspension system. In addition, the fore-aft loading of beam 18 of suspension assembly 14 can potentially reduce the effectiveness of the components of axle/suspension system 10 and/or shock absorber 40. Therefore, a need exists in the art for a damper that is capable of managing or controlling the direction of damping of the axle/suspension system relative to a predetermined datum, which results in optimized damping of the axle/suspension system during operation of the heavy-duty vehicle, and resulting in improved ride quality for the heavy-duty vehicle.

The preferred embodiment directional dampers of the present invention accomplish these needs, and the structure and operation of the preferred embodiment directional dampers are described in detail below.

Figure 3:
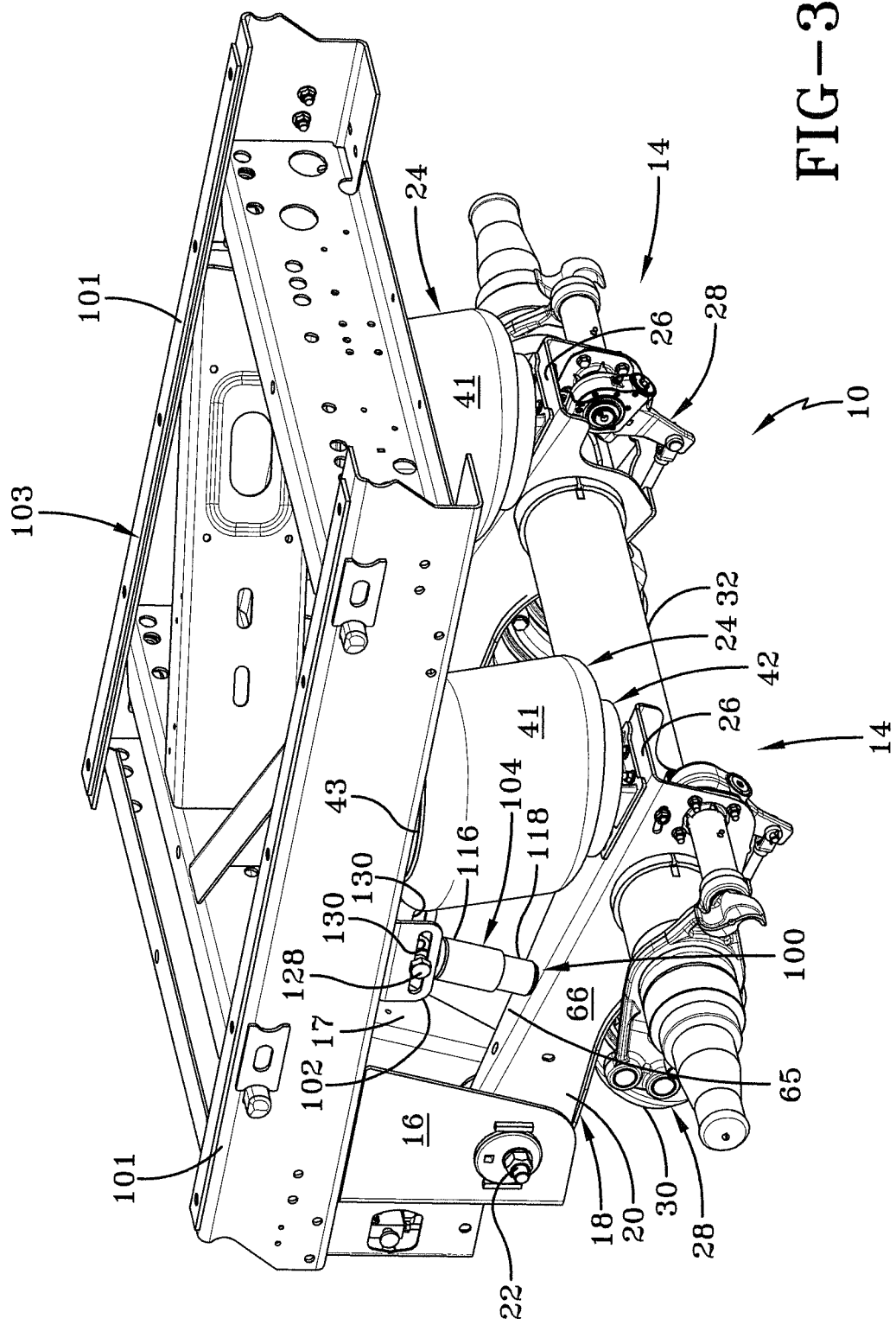
FIG. 3 is a view similar to FIG. 2, but showing the axle/suspension system at the design ride height of the vehicle.
Figure 4:
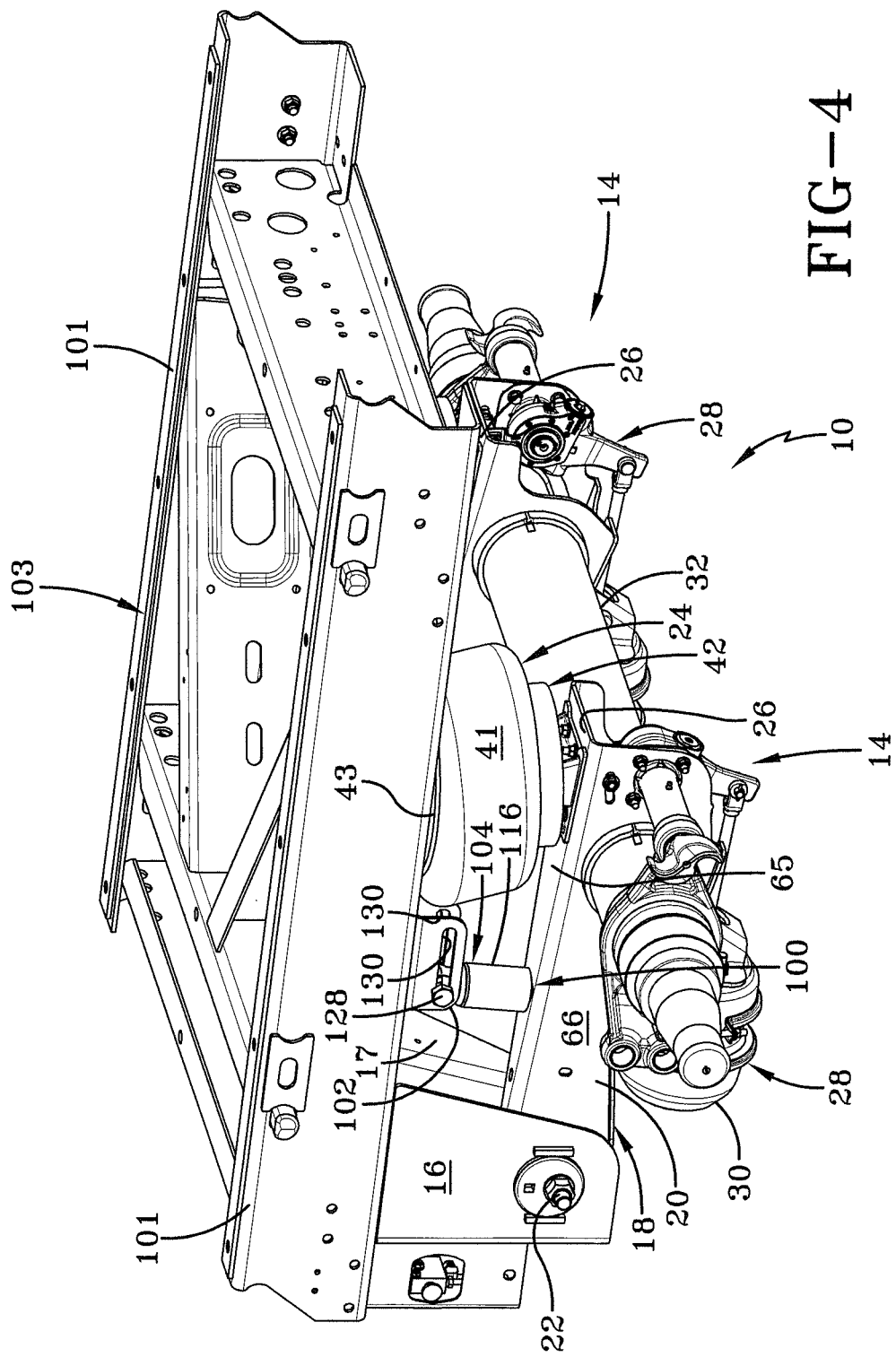
FIG. 4 is a view similar to FIG. 2, but showing the axle/suspension system in a compressed or jounce position.
Figure 5:
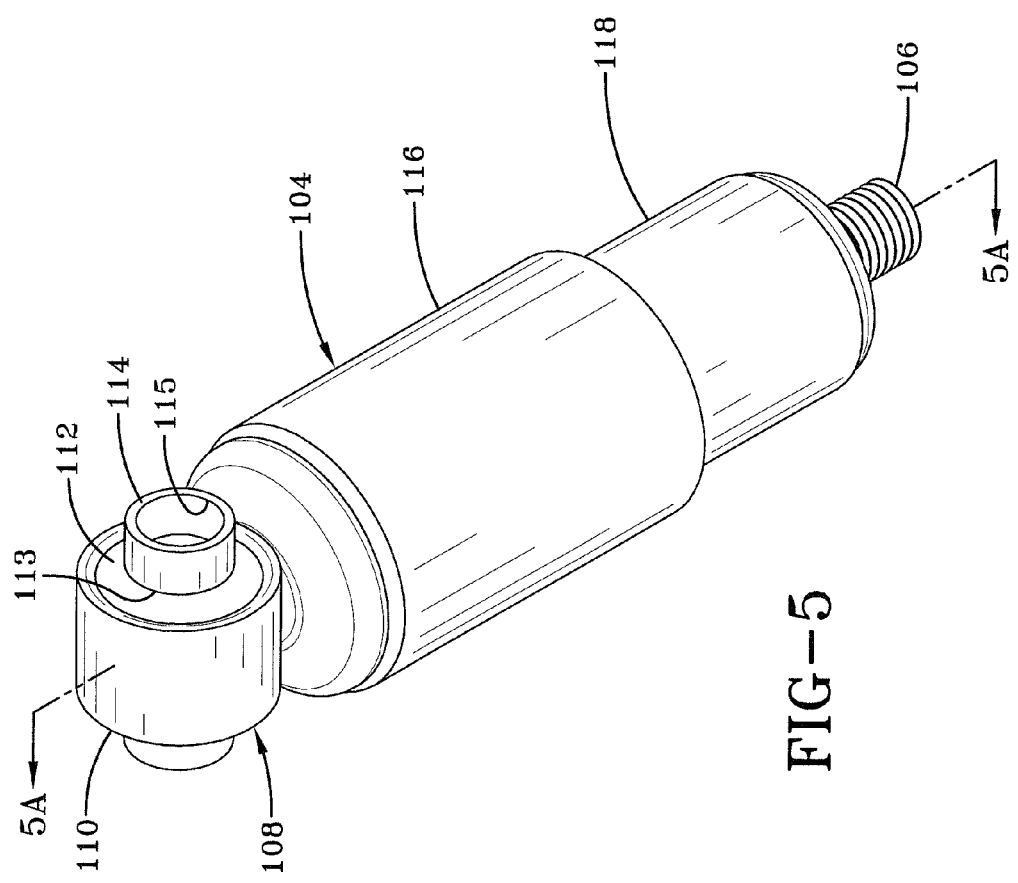
FIG. 5 is a greatly enlarged isolated perspective view of the damper body of the directional damper of the present invention removed from the suspension assembly, showing a threaded lower post extending from the lower end of the damper body and an upper bushing assembly attached to the upper end of the damper body.
Figure 5A:
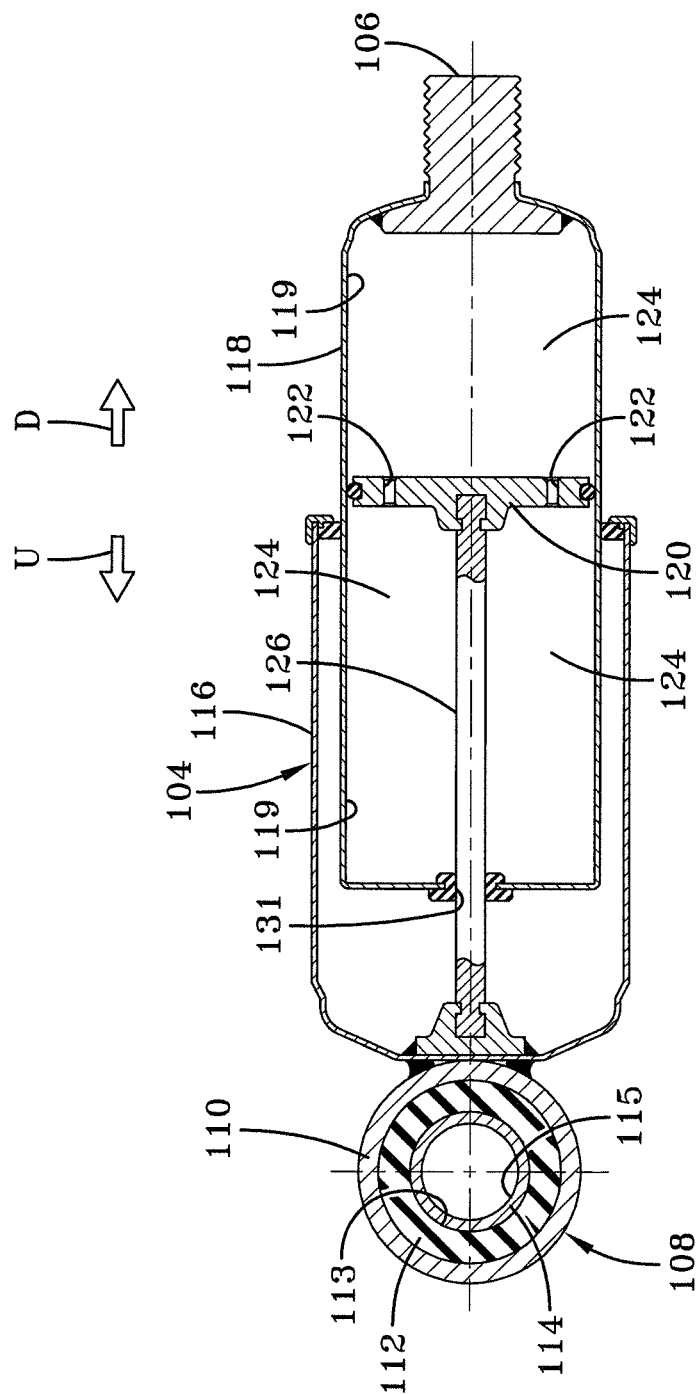
FIG. 5A is a schematic cross sectional view of the damper body shown in FIG. 5, showing the plunger extending into the lower portion of the damper body and attached to a diaphragm that includes a pair of openings, and showing the lower portion of the damper body being filled with fluid.

Turning now to FIGS. 2-5A, a first preferred embodiment directional damper for a heavy-duty axle/suspension system is shown at reference numeral 100 utilized in connection with an axle/suspension system 10 as described more fully above. Directional damper 100 generally includes a damper body 104 slidably engaged with a main member bracket 102. With particular reference to FIGS. 5 and 5A, the structure of damper body 104 will be described in more detail below.

Damper body 104 includes an upper inverted cup portion 116 that is slip fit over a lower portion 118. A threaded post 106 extends from the lowermost end of damper body lower portion 118. A bushing assembly 108 is attached to the uppermost end of inverted cup portion 116. More specifically, bushing assembly 108 includes an outer generally cylindrical carrier 110 formed from metal or other sufficiently rigid material. A bushing 112 formed with a continuous opening 113 at its center is press fit into cylindrical carrier 110. An inner sleeve 114 having a generally cylindrical shape and formed with a continuous opening 115 in its center is press fit into opening 113 of bushing 112 and fixedly attached therein by an adhesive, or other means of attachment. Inner sleeve 114 extends generally outwardly past bushing 112 and carrier 110. Carrier 110 is fixedly attached to the uppermost end of inverted cup portion 116 via welds or other similar means of rigid attachment. Lower portion 118 includes a chamber 119, which is filled with fluid 124. Chamber 119 also includes a generally circular flat diaphragm 120 formed with a pair of openings 122 that allow communication of fluid 124 through the diaphragm and within or throughout the entire chamber. Diaphragm 120 is attached to a plunger 126 on its uppermost surface. Plunger 126 extends from diaphragm 120, through chamber 119 and fluid 124, through an opening 131 formed in the uppermost portion of lower portion 118, and is attached to the inner surface of inverted cup 116. As inverted cup portion 116 slides downwardly over lower portion 118 of damper body 104 during operation of the vehicle, plunger 126 moves diaphragm 120 downwardly in direction D. Additionally as inverted cup portion 116 slides upwardly over lower portion 118 of damper body 104 during operation of the vehicle, plunger 126 moves diaphragm 120 upwardly in direction U. The upward and downward movement of diaphragm 120 provides viscous damping to damper body 104 during operation of the heavy-duty vehicle due to fluid 124 contained in chamber 119 and openings 122.

According to an important aspect of the present invention, the lower end of first preferred embodiment directional damper 100 is fixedly attached to top plate 65 of beam 18 via threaded post 106. More specifically, threaded post 106 is threaded into a threaded opening (not shown) formed in beam top plate 65. The upper end of first preferred embodiment directional damper 100 is slidably engaged with longitudinally extending main member bracket 102 that is rigidly attached to the bottom-most surface of its respective main member 101 of a slider box 103. More specifically, main member bracket 102 is a clevis-type bracket having a generally inverted U-shaped cross section. An elongated longitudinally extending opening 130 is formed in each clevis, so that the elongated openings generally align with one another and are parallel to main member 101. A fastener 128 is disposed through aligned openings 130 and through inner sleeve opening 115 in order to slidably engage the upper end of directional damper 100 to main member bracket 102 and in turn to main member 101. Fastener 128 allows the upper end of directional damper 100 to slide freely along elongated openings during operation of the vehicle as will be described in detail below. Having now described the structure of first preferred embodiment directional damper 100 of the present invention, the operation of the damper during operation of the vehicle will be described in detail below.

Figure 2:
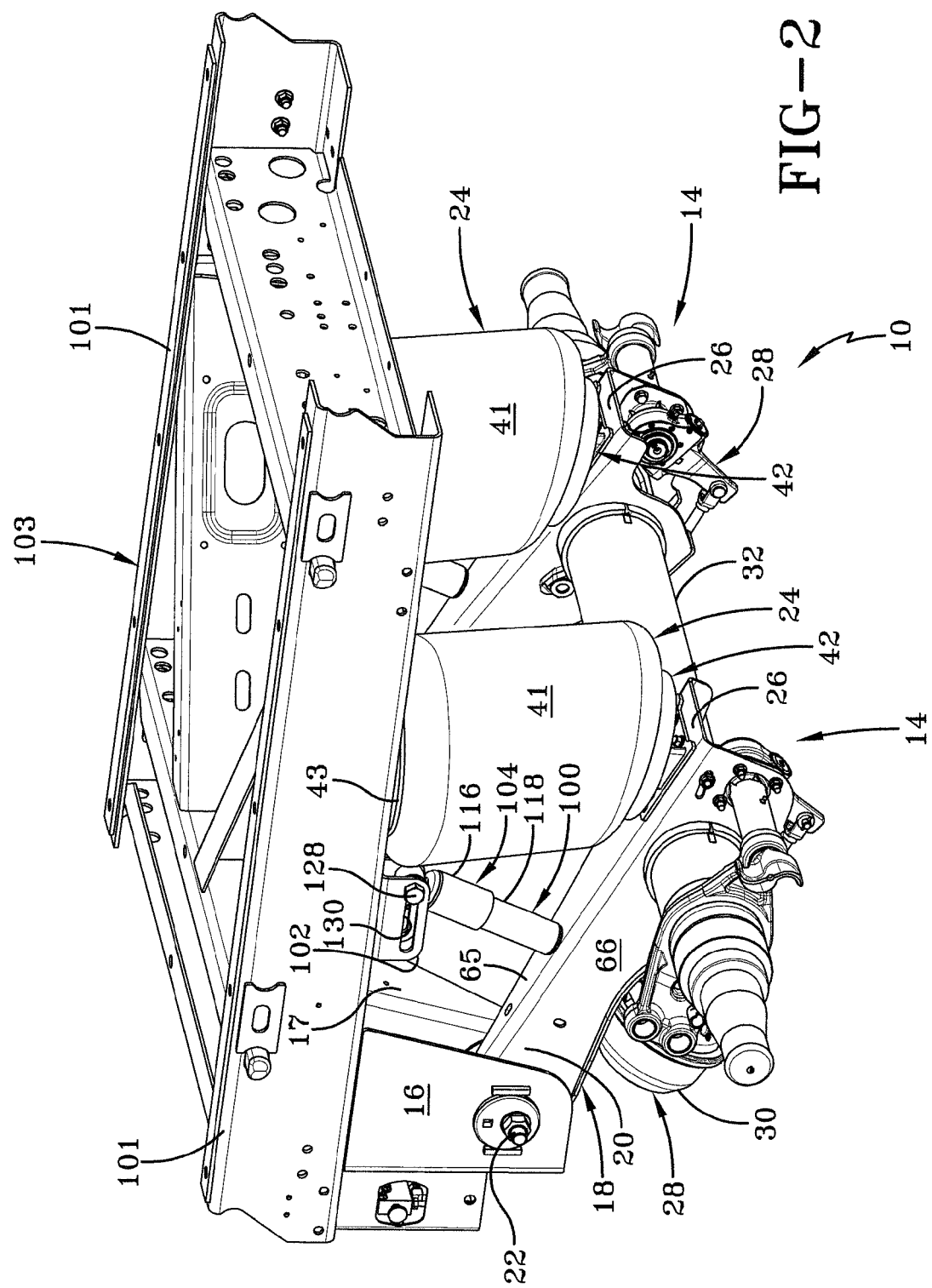
FIG. 2 is a fragmentary top rear perspective view of a slider box for a heavy-duty vehicle incorporating a first preferred embodiment directional damper of the present invention, showing the directional damper fixedly attached to the beam of the suspension assembly and slidably engaged with a main member bracket that is in turn connected to its respective main member of the slider box, and showing the axle/suspension system in an extended or rebound position.

Turning now to FIG. 2, first preferred embodiment directional damper 100 is shown being utilized in conjunction with axle/suspension system 10. Axle/suspension system 10 is in an extended or rebound position such as when the wheels (not shown) of the vehicle encounter a hole or depression in the road, such that beam 18 is rotated suddenly downwardly. As can be seen in FIG. 2, when axle/suspension system 10 is in an extended position during operation of the vehicle, the upper end of first preferred embodiment directional damper 100 moves to and is slidably engaged with the rearward-most portion of aligned openings 130 of main member bracket 102.

Turning now to FIG. 3, first preferred embodiment directional damper 100 is shown utilized with axle/suspension system 10. Axle/suspension system 10 is generally at design ride height. As can be seen in FIG. 3, when axle/suspension 10 is at design ride height during operation of the vehicle, the upper end of first preferred embodiment directional damper 100 of the present invention moves to and is slidably engaged with the generally middle portion of aligned openings 130 of main member bracket 102.

Turning now to FIG. 4, first preferred embodiment directional damper 100 is shown utilized with axle/suspension system 10. Axle/suspension system 10 is generally in a compressed or jounce position, such as when the trailer has been loaded with cargo and beam 18 of the axle/suspension system has generally rotated upwardly toward the main member of the vehicle. As can be seen in FIG. 4, when axle/suspension 10 is in a compressed position during operation of the vehicle, the upper end of first preferred embodiment directional damper 100 of the present invention moves to and is slidably engaged with the generally frontwardmost portion of aligned openings 130 of main member bracket 102.

The slidable engagement of the upper end of directional damper 100 along elongated openings 130 formed in main member bracket 102 allows the directional damper to control or manage the direction of the damping provided by the directional damper during operation of the vehicle with respect to a particular datum. In this case, the datum is beam 18 of axle/suspension system 10. More particularly, as the position of axle/suspension system 10 changes during operation of the vehicle as described above, the slidable engagement of the upper end of directional damper 100 along aligned openings 130 of main member bracket 102 provides damping that is generally perpendicular to the datum, or beam 18, regardless of the relative rotational position of the beam and the vehicle frame main member. This is beneficial because maintenance of the perpendicular position of damper 100 relative to the datum eliminates the potential for fore-aft forces or loading being transmitted from the directional damper to axle/suspension system 10 during operation of the vehicle.

Figure 7:
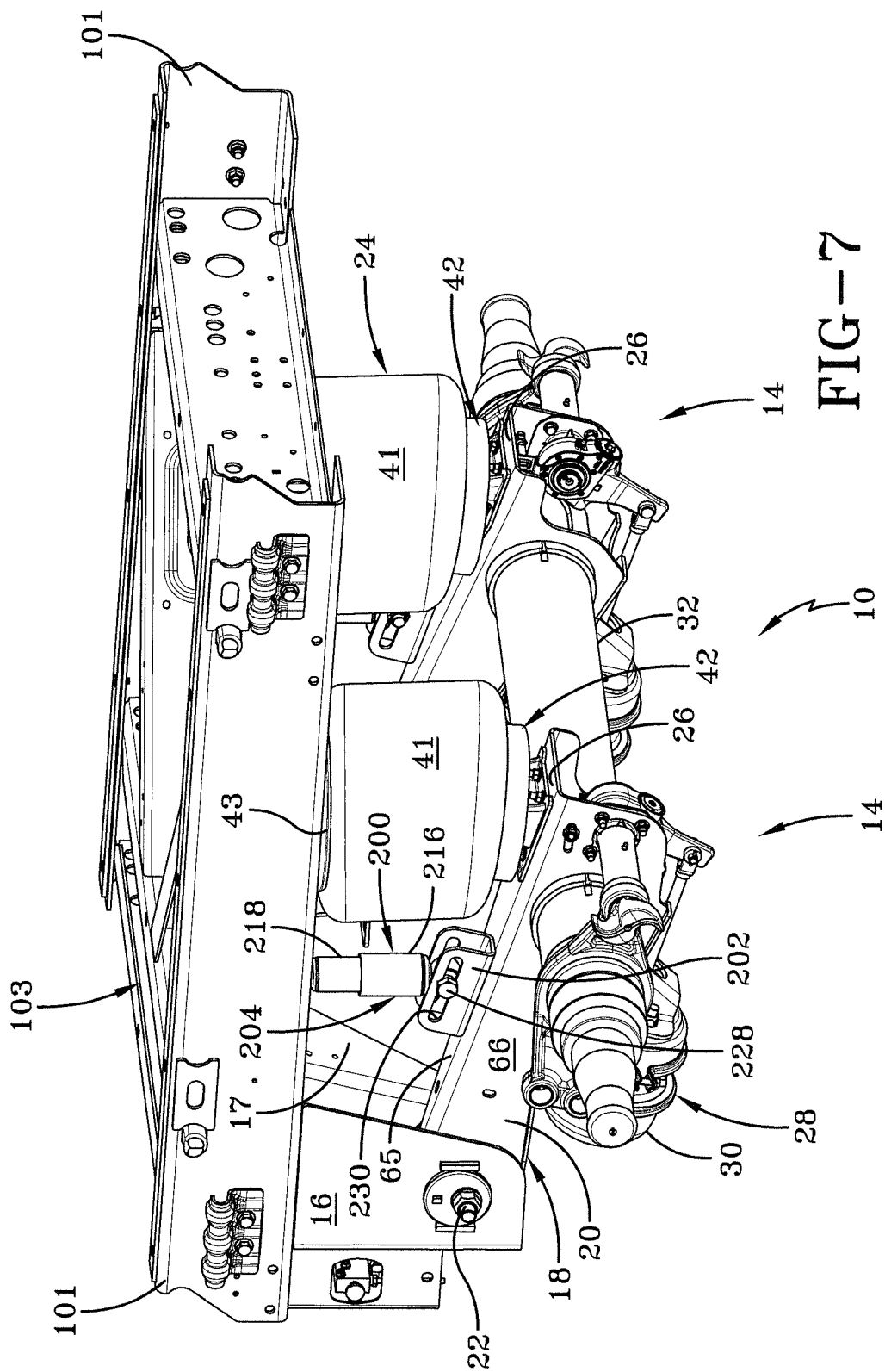
FIG. 7 is a view similar to FIG. 6, but showing the axle/suspension system at the design ride height of the vehicle.
Figure 8:
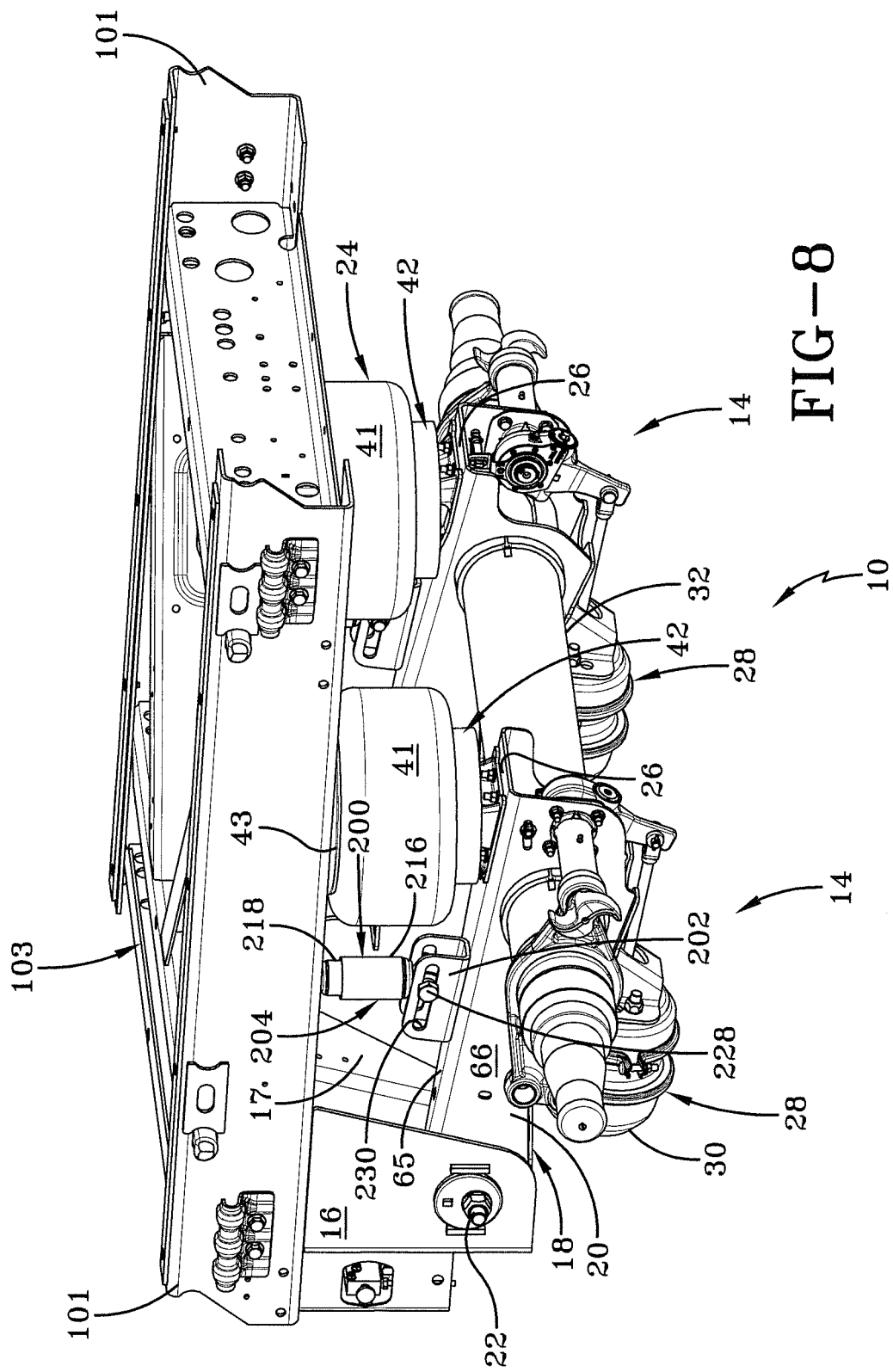
FIG. 8 is a view similar to FIG. 6, but showing the axle/suspension system in a compressed or jounce position.
Figure 9:
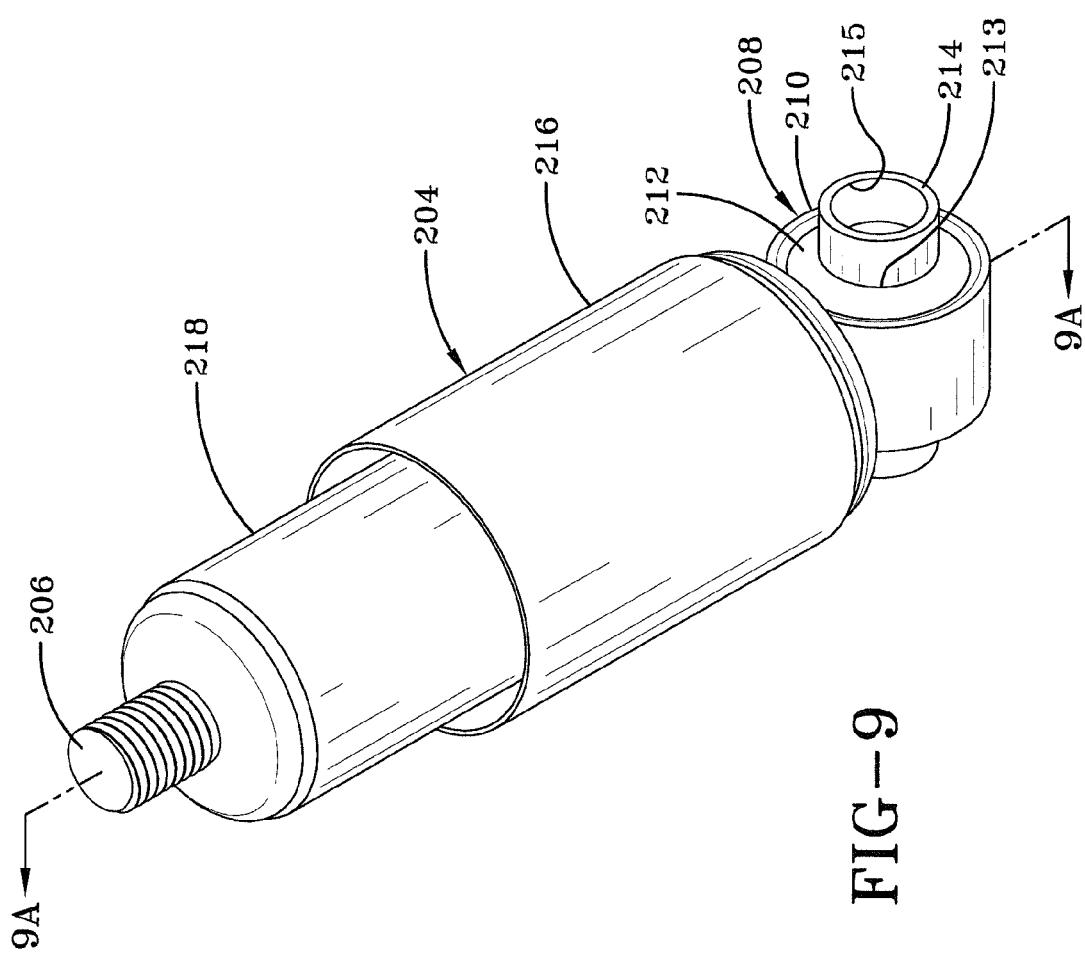
FIG. 9 is a greatly enlarged isolated perspective view of the damper body of the second preferred embodiment directional damper of the present invention removed from the suspension assembly, showing a threaded upper post extending from the upper end of the damper body and a lower bushing assembly attached to the lower end of the damper body.
Figure 9A:
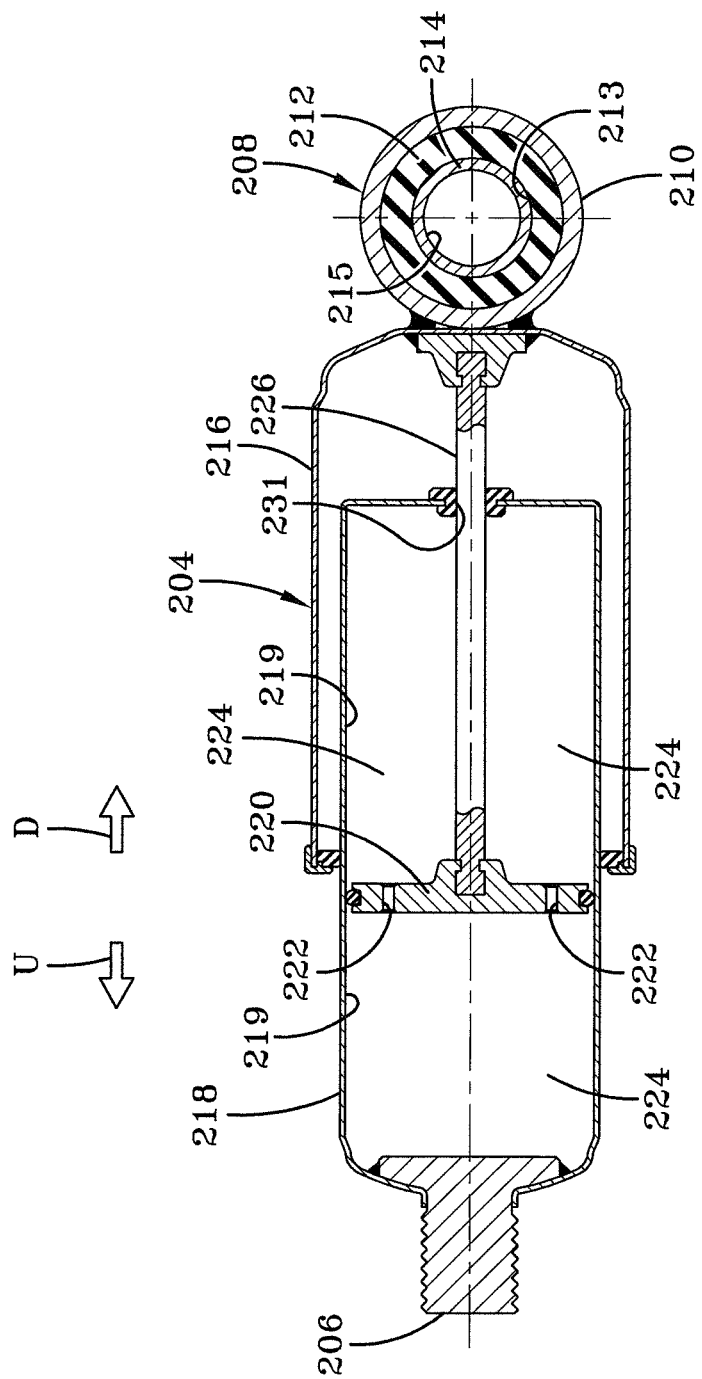
FIG. 9A is a schematic cross sectional view of the damper body shown in FIG. 9, showing the plunger extending into the upper portion of the damper body and attached to a diaphragm that includes a pair of openings, and showing the upper portion of the damper body being filled with fluid.

Turning now to FIGS. 6-9A, a second preferred embodiment directional damper for a heavy-duty axle/suspension system is shown at reference numeral 200 utilized in connection with an axle/suspension system 10 as described more fully above. Directional damper 200 generally includes a damper body 204 slidably engaged with a beam bracket 202. With particular reference to FIGS. 9 and 9A, the structure of damper body 204 will be described in more detail below.

Damper body 204 includes a lower inverted cup portion 216 that is slip fit over an upper portion 218. A threaded post 206 extends from the uppermost end of damper body upper portion 218. A bushing assembly 208 is attached to the lowermost end of inverted cup portion 216. More specifically, bushing assembly 208 includes an outer generally cylindrical carrier 210 formed from metal or other sufficiently rigid material. A bushing 212 formed with a continuous opening 213 at its center is press fit into cylindrical carrier 210. An inner sleeve 214 having a generally cylindrical shape and formed with a continuous opening 215 at its center is press fit into opening 213 of bushing 212 and fixedly attached therein by an adhesive or other suitable means. Inner sleeve 214 extends generally outwardly past bushing 212 and carrier 210. Carrier 210 is fixedly attached to the bottommost end of inverted cup portion 216 via welds or other similar means of rigid attachment. Upper portion 218 includes a chamber 219, which is filled with fluid 224. Chamber 219 also includes a generally circular flat diaphragm 220 formed with a pair of openings 222 that allow communication of fluid 224 through the diaphragm and throughout the chamber. Diaphragm 220 is attached to a plunger 226 on its lowermost surface. Plunger 226 extends from diaphragm 220 through chamber 219 and fluid 224, through an opening 231 formed in the lowermost portion of upper portion 218, and is attached to the inner surface of inverted cup 216. As inverted cup portion 216 slides downwardly over upper portion 218 of damper body 204 during operation of the vehicle, plunger 226 moves diaphragm 220 downwardly in direction D. Additionally as inverted cup portion 216 slides upwardly over upper portion 218 of damper body 204 during operation of the vehicle, plunger 226 moves diaphragm 220 upwardly in direction U. The upward and downward movement of diaphragm 220 provides viscous damping to damper body 204 during operation of the heavy-duty vehicle due to fluid 224 contained in chamber 219 and openings 222.

According to an important aspect of the present invention, the upper end of second preferred embodiment directional damper 200 is fixedly attached to a main member 101 of slider box 103 via threaded post 206. More specifically, threaded post 206 is threaded into a threaded opening (not shown) formed in main member 201. The lower end of second preferred embodiment directional damper 200 is slidably engaged with longitudinally extending beam bracket 202 that is rigidly attached to the uppermost surface of its respective beam top plate 65. Beam bracket 202 is a clevis-type bracket having a generally U-shaped cross section. An elongated longitudinally extending opening 230 is formed in each clevis, so that the elongated openings generally align with one another and generally are parallel to beam 18. A fastener 228 is disposed through aligned openings 230 and through inner sleeve opening 215 in order to slidably engage the lower end of directional damper 200 to beam bracket 202 and in turn to beam 18. Fastener 228 allows the lower end of directional damper 200 to slide along elongated openings during operation of the vehicle as will be described in detail below. Having now described the structure of the second preferred embodiment directional damper 200 of the present invention, the operation of the damper during operation of the vehicle will be described in detail below.

Figure 6:
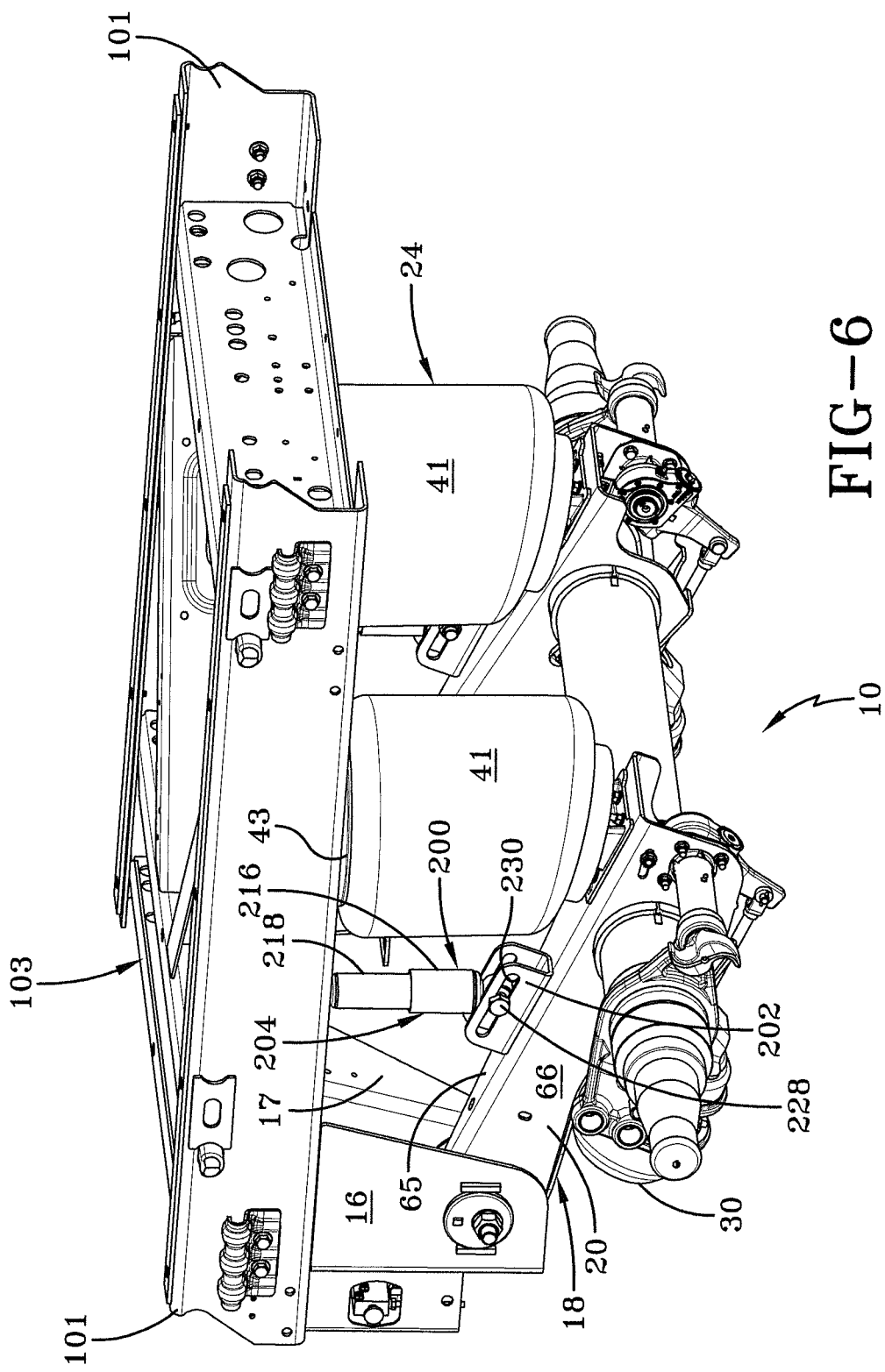
FIG. 6 is a fragmentary rear perspective view of a slider box for a heavy-duty vehicle incorporating a second preferred embodiment directional damper of the present invention, showing the directional damper fixedly attached to the main member of the slider box and slidably connected to a beam bracket that is in turn connected to its respective beam of the suspension assembly, and showing the axle/suspension system in an extended or rebound position.

Turning now to FIG. 6, second preferred embodiment directional damper 200 is shown being utilized in conjunction with axle/suspension system 10. Axle/suspension system 10 is shown in an extended or rebound position such as when the wheels (not shown) of the vehicle encounter a hole or depression in the road, such that beam 18 is rotated suddenly downwardly. As can be seen in FIG. 6, when axle/suspension system 10 is in an extended position during operation of the vehicle, the lower end of second preferred embodiment directional damper 200 moves to and is slidably engaged with the generally rearward-most portion of aligned openings 230 of beam bracket 202.

Turning now to FIG. 7, second preferred embodiment directional damper 200 is shown utilized with axle/suspension system 10. Axle/suspension system 10 is generally at design ride height. As can be seen in FIG. 7, when axle/suspension 10 is at design ride height during operation of the vehicle, the lower end of second preferred embodiment directional damper 200 of the present invention moves to and is slidably engaged with the generally middle portion of aligned openings 230 of beam bracket 202.

Turning now to FIG. 8, second preferred embodiment directional damper 200 is shown utilized with axle/suspension system 10. Axle/suspension system 10 is generally in a compressed or jounce position, such as when the trailer has been loaded with cargo and beam 18 of the axle/suspension system has generally rotated upwardly toward the main member of the vehicle. As can be seen in FIG. 8, when axle/suspension 10 is in a compressed position during operation of the vehicle, the lower end of second preferred embodiment directional damper 200 of the present invention moves to and is slidably engaged with the generally frontward-most portion of aligned openings 230 of main member bracket 202.

The slidable engagement of the lower end of second preferred embodiment directional damper 200 along elongated openings 230 formed in beam bracket 202 allows the directional damper to control or manage the direction of the damping during operation of the vehicle with respect to a particular datum. In this case, the datum is main member 101 of the heavy-duty vehicle. More particularly, as the position of axle/suspension system 10 changes during operation of the vehicle, the slidable engagement of the lower end of directional damper 200 along aligned openings 230 of beam bracket 202 provides damping that is generally perpendicular to the datum, or main member 101, regardless of the relative position of the beam and the vehicle frame main member. This is beneficial because maintenance of the perpendicular position of damper 200 relative to the datum eliminates the potential for fore-aft forces or loading being transmitted from the directional damper to axle/suspension system 10 during operation of the vehicle.

Figure 10:
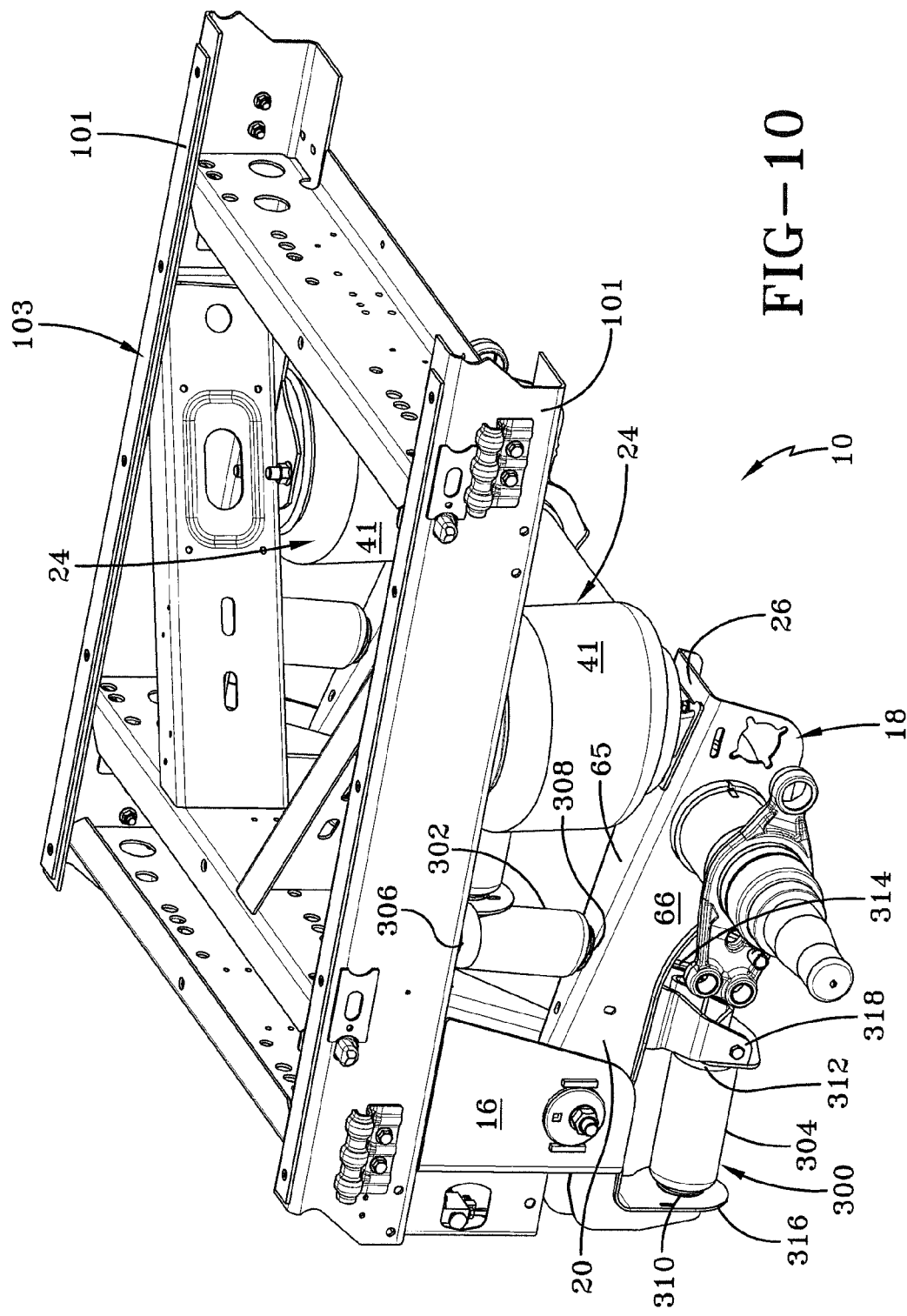
FIG. 10 is a fragmentary top rear perspective view of a slider box for a heavy-duty vehicle incorporating a third preferred embodiment directional damper of the present invention, showing the first and second air bags of the third preferred embodiment directional damper, with the first air bag connected generally between the beam of the suspension assembly and the main member of the slider box and the second air bag connected generally between two arms extending downwardly from the hanger and the beam, respectively, and showing the first and second air bags pneumatically connected to one another by a conduit.
Figure 11:
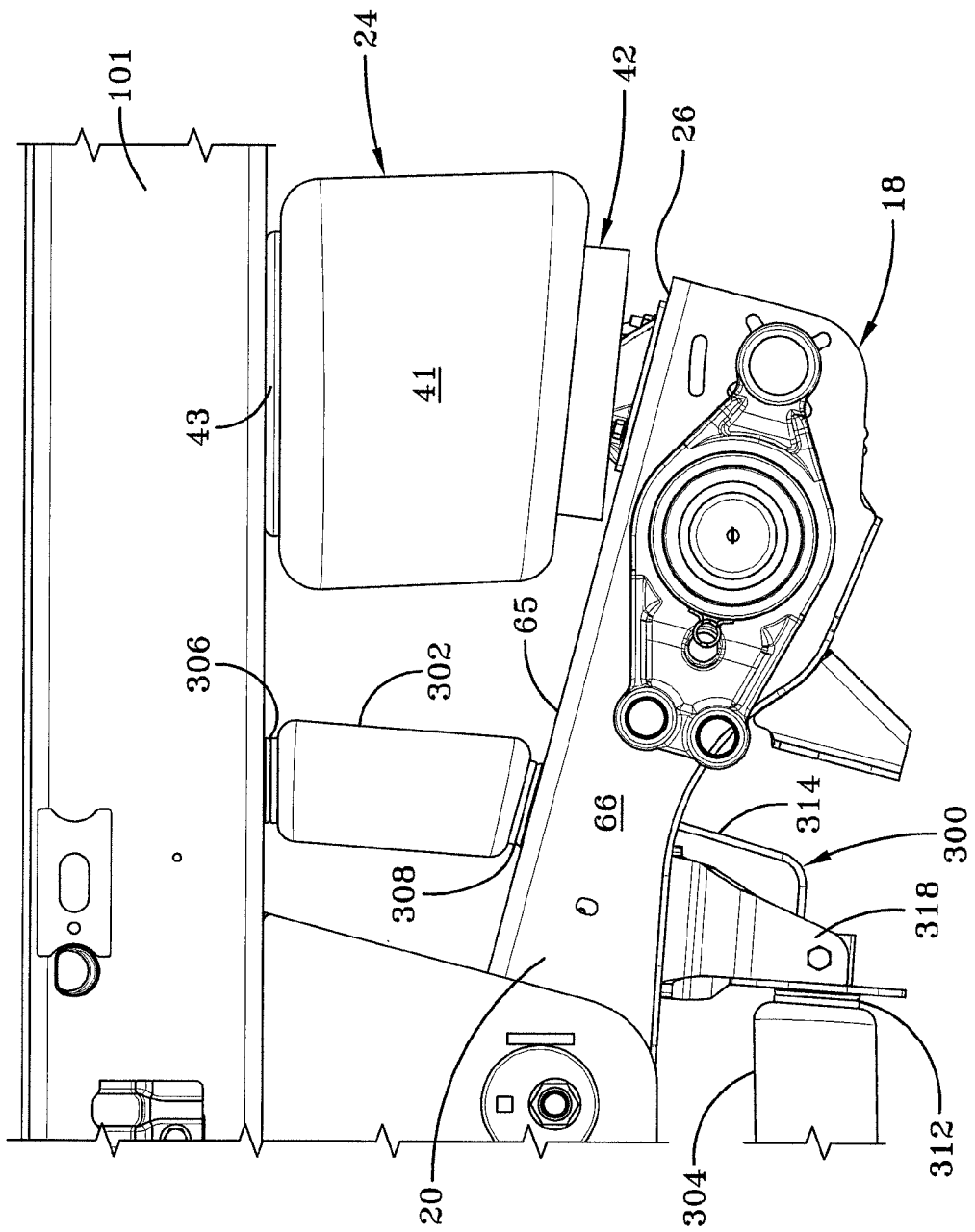
FIG. 11 is an enlarged fragmentary driver side view of the slider box shown in FIG. 10, showing the conduit connecting the first and second air bags of the third preferred embodiment directional damper of the present invention.

Turning now to FIGS. 10 and 11, a third preferred embodiment directional damper for heavy-duty axle/suspension systems is shown at reference numeral 300 utilized in connection with an axle/suspension system 10 as described more fully above. Directional damper 300 generally includes a first air bag 302 pneumatically connected to a second air bag 304 via a conduit 314. First air bag 302 and second air bag 304 are generally formed from rubber or other pliable material and are sealed to atmosphere. More specifically first air bag 302 is generally cylindrically shaped with a flat upper end 306 and a flat bottom end 308. First air bag upper end 306 is attached to main member 101 of slider box 103 via fasteners (not shown). First air bag lower end 308 is attached to beam 18 of axle/suspension system 10 via fasteners (not shown). First air bag 302 includes an opening formed through lower end 308 through which the upper end of conduit 314 is disposed. Second air bag 304 is generally cylindrically shaped with a flat front end 310 and a flat rear end 312. Second air bag front end 310 is attached to a hanger bracket 316 via fasteners (not shown). Hanger bracket 316 is in turn attached to the front surface of hanger 16 via welds or fasteners (not shown) and depends from the hanger. Second air bag rear end 312 is attached to beam bracket 318 via welds or fasteners (not shown). Beam bracket 318 is in turn attached to beam 18 via welds or fasteners (not shown) and depends from beam 18. Second air bag 304 is formed with an opening through rear end 312, through which the front end of conduit 314 is disposed. As set forth above, the chamber of first air bag 302 is in fluid communication with the chamber of second air bag 304 via conduit 314. Having now described the general structure of third preferred embodiment directional damper for heavy-duty vehicle axle/suspension systems of the present invention, the operation of the third preferred embodiment directional damper will now be described in detail below.

Third preferred embodiment directional damper 300 of the present invention provides viscous damping to axle/suspension system 10. More specifically, when axle/suspension system 10 becomes extended, or when beam 18 is rotated away from main member 101 such as when the wheel of the vehicle encounters a pot hole or depression, first air bag 302 becomes extended, and second air bag 304 becomes compressed, thereby directing air from second air bag 304, through conduit 314 into first air bag 302. Likewise, when axle/suspension system 10 becomes compressed, or when beam 18 is rotated toward main member 101 such as when the wheels of the vehicle encounter a large fixed object on the ground, first air bag 302 becomes compressed, and second air bag 304 becomes extended, thereby directing air from the first air bag, through conduit 314, into the second air bag. The flow of air through directional damper 300, from first air bag 302, through conduit 314, into second air bag 302, and vice versa, provides viscous damping to beam 18 of axle/suspension system 10 during operation of the vehicle. More particularly, the restricted size of conduit 314, which is in fluid communication with first air bag 302 and second air bag 304 provides viscous damping to directional damper 300.

In accordance with a primary feature of the present invention, third preferred embodiment directional damper 300 provides damping that is generally perpendicular to the datum, or beam 18, regardless of the relative position of the beam and the vehicle frame main member. This is beneficial because maintenance of the perpendicular position of damper 300 relative to the datum eliminates the potential for fore-aft forces or loading being transmitted from the directional damper to axle/suspension system 10 during operation of the vehicle.

Preferred embodiment directional dampers 100,200,300 of the present invention overcome the problems associated with prior art shock absorbers, mainly fore-aft loading, by providing a directional damper that is capable of managing or controlling the overall direction of viscous damping of the axle/suspension system relative to a predetermined datum that results in optimized damping of the axle/suspension system during operation of the heavy-duty vehicle, resulting in improved ride quality for the heavy-duty vehicle.

It is contemplated that preferred embodiment directional dampers 100,200,300 of the present invention could be utilized in conjunction with all types of suspension assemblies for axle/suspension systems that operate in more than a single plane, without changing the overall concept or operation of the present invention. It is also contemplated that preferred embodiment directional dampers 100,200,300 of the present invention could provide viscous damping of the axle/suspension system relative to any predetermined datum, such as a line drawn from the center of the pivot of the beam to the center of the axle, without changing the overall concept or operation of the present invention. It is further contemplated that preferred embodiment directional dampers 100,200,300 of the present invention could be pneumatic or hydraulic without changing the overall concept or operation of the present invention. It is also contemplated that the concepts of the present invention could even be incorporated into an air spring, without changing the overall concept or operation of the present invention. It is even further contemplated that preferred embodiment directional dampers 100,200 of the present invention could be utilized with different internal damper body structures, without changing the overall concept or operation of the present invention. It is also contemplated that preferred embodiment directional dampers 100,200,300 of the present invention could be positioned at alternate locations on the axle suspension system, without changing the overall concept or operation of the present invention. It is contemplated that preferred embodiment directional dampers 100,200 could be utilized with other types of diaphragms, such as ones that allow fluid to flow around the perimeter of the diaphragm, without changing the overall concept or operation of the present invention. It is even further contemplated that preferred embodiment directional dampers 100, 200 of the present invention could be utilized with different types of bushings, without changing the overall concept or operation of the present invention. It is contemplated that preferred embodiment directional dampers 100,200,300 of the present invention could utilize other fasteners without changing the overall concept or operation of the present invention. It is also contemplated that preferred embodiment directional dampers 100,200,300 of the present invention could be utilized with other bracket configurations without changing the overall concept or operation of the present invention. It is further contemplated that preferred embodiment directional dampers 100,200 of the present invention could utilize other means of fixed attachment of damper body 104,204 to the beam or the vehicle frame, without changing the overall concept or operation of the present invention.

The present invention has been described with reference to a specific embodiment. It is to be understood that this illustration is by way of example and not by way of limitation. Potential modifications and alterations will occur to others upon a reading and understanding of this disclosure, and it is understood that the invention includes all such modifications, alterations, and equivalents thereof.

Accordingly, the directional damper for heavy-duty vehicle axle/suspension systems is simplified, provides an effective, safe, inexpensive and efficient structure and method which achieves all the enumerated objectives, provides for eliminating difficulties encountered with prior art dampers, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the directional damper for heavy-duty vehicle axle/suspension systems is installed and used, the characteristics of the construction, arrangement and method steps, and the advantageous, new and useful results obtained; the new and useful structures, devices, elements, arrangements, process, parts and combinations are set forth in the appended claims.

What is claimed is:

1. A heavy-duty vehicle axle/suspension system having damping features comprising:
   a damping means disposed between a frame of said vehicle and a suspension assembly of said axle/suspension system of said vehicle for providing directional damping to said suspension assembly that is generally perpendicular to a selected datum.

2. The heavy-duty vehicle axle/suspension system having damping features of claim 1,
   said damping means further comprising a first end and a second end, said first end of said damping means slidably connected to a main member of said vehicle, said second end of said damping means fixedly connected to a beam of said suspension assembly of said axle/suspension system.

3. The heavy-duty vehicle axle/suspension system having damping features of claim 1, said damping means further comprising a first end and a second end, said first end of said damping means fixedly connected to a main member of said vehicle, said second end of said damping means slidably connected to a beam of said suspension assembly of said axle/suspension system.

4. The heavy-duty vehicle axle/suspension system having damping features of claim 2, wherein said slidable connection of said damping means first end to said main member further comprises a main member bracket connected to said main member, said main member bracket including an elongated opening, said damping means first end fastened into said elongated opening.

5. The heavy-duty vehicle axle/suspension system having damping features of claim 3, wherein said slidable connection of said damping means second end to said beam of said suspension assembly further comprises a beam bracket connected to said beam, said beam bracket including an elongated opening, said damping means second end fastened into said elongated opening.

6. The heavy-duty vehicle axle/suspension system having damping features of claim 4, wherein said main member bracket elongated opening is generally parallel to said main member.

7. The heavy-duty vehicle axle/suspension system having damping features of claim 5, wherein said beam bracket elongated opening is generally parallel to said beam.

8. The heavy-duty vehicle axle/suspension system having damping features of claim 1, said damping means further comprising a first air bag disposed between and connected to a beam of said suspension assembly of said vehicle and a main member of said vehicle, and a second air bag disposed between and connected to said beam and a hanger of said vehicle, said first and second air bags being fluidly connected to each other via a conduit.

9. The heavy-duty vehicle axle/suspension system having damping features of claim 8, further comprising a beam bracket attached to an underside of said beam, a hanger bracket attached to said hanger, said second air bag disposed between and connected to said hanger bracket and said beam bracket.

10. The heavy-duty vehicle axle/suspension system having damping features of claim 1, said selected datum being chosen from the group consisting of a beam of said suspension assembly of said vehicle and a main member of said vehicle.

11. The heavy-duty vehicle axle/suspension system having damping features of claim 1, said damping means further comprising a first chamber and a second chamber, a diaphragm located between said chambers, said diaphragm including an opening, wherein said first chamber of said damping means is in fluid communication with said second chamber of said damping means.

12. The heavy-duty vehicle axle/suspension system having damping features of claim 2, said slidable connection of said first end of said damping means to said main member further comprises a pivotable and slidable connection.

13. The heavy-duty vehicle axle/suspension system having damping features of claim 3, said slidable connection of said second end of said damping means to said beam of said suspension assembly further comprises a pivotable and slidable connection.

14. A heavy-duty vehicle axle/suspension system having damping features comprising:
a damping means disposed between a frame of said vehicle and a suspension assembly of said axle/suspension system of said vehicle, said damping means further comprising a first end and a second end, said first end or said second end of said damping means fixedly connected to said vehicle.

15. A heavy-duty vehicle axle/suspension system having damping features comprising:
a damping means disposed between a frame of said vehicle and a suspension assembly of said axle/suspension system of said vehicle for providing directional damping to said suspension assembly with respect to a selected datum, said damping means further comprising a first end and a second end, said first end of said damping means slidably connected to a main member of said vehicle, said second end of said damping means fixedly connected to a beam of said suspension assembly of said axle/suspension system, wherein said slidable connection of said damping means first end to said main member further comprises a main member bracket connected to said main member, said main member bracket including an elongated opening, said damping means first end fastened into said elongated opening, wherein said main member bracket elongated opening is generally parallel to said main member.

16. A heavy-duty vehicle axle/suspension system having damping features comprising:
a damping means disposed between a frame of said vehicle and a suspension assembly of said axle/suspension system of said vehicle for providing directional damping to said suspension assembly with respect to a selected datum, said damping means further comprising a first end and a second end, said first end of said damping means fixedly connected to a main member of said vehicle, said second end of said damping means slidably connected to a beam of said suspension assembly of said axle/suspension system, wherein said slidable connection of said damping means second end to said beam of said suspension assembly further comprises a beam bracket connected to said beam, said beam bracket including an elongated opening, said damping means second end fastened into said elongated opening, wherein said beam bracket elongated opening is generally parallel to said beam.

17. A heavy-duty vehicle axle/suspension system having damping features comprising:
a damping means disposed between a frame of said vehicle and a suspension assembly of said axle/suspension system of said vehicle for providing directional damping to said suspension assembly with respect to a selected datum, said damping means further comprising a first air bag disposed between and connected to a beam of said suspension assembly of said vehicle and a main member of said vehicle, and a second air bag disposed between and connected to said beam and a hanger of said vehicle, said first and second air bags being fluidly connected to each other via a conduit, further comprising a beam bracket attached to an underside of said beam, a hanger bracket attached to said hanger, said second air bag disposed between and connected to said hanger bracket and said beam bracket.

18. A heavy-duty vehicle axle/suspension system having damping features comprising:
a damping means disposed between a frame of said vehicle and a suspension assembly of said axle/suspension system of said vehicle for providing directional damping to said suspension assembly with respect to a selected datum, said damping means further comprising a first chamber and a second chamber, a diaphragm located between said chambers, said diaphragm including an opening, wherein said first chamber of said damping means is in fluid communication with said second chamber of said damping means.

19. A heavy-duty vehicle axle/suspension system having damping features comprising:
a damping means disposed between a frame of said vehicle and a suspension assembly of said axle/suspension system of said vehicle for providing directional damping to said suspension assembly with respect to a selected datum, said damping means further comprising a first end and a second end, said first end of said damping means slidably connected to a main member of said vehicle, said second end of said damping means fixedly connected to a beam of said suspension assembly of said axle/suspension system, said slidable connection of said first end of said damping means to said main member further comprises a pivotable and slidable connection.

20. A heavy-duty vehicle axle/suspension system having damping features comprising:

a damping means disposed between a frame of said vehicle and a suspension assembly of said axle/suspension system of said vehicle for providing directional damping to said suspension assembly with respect to a selected datum, said damping means further comprising a first end and a second end, said first end of said damping means fixedly connected to a main member of said vehicle, said second end of said damping means slidably connected to a beam of said suspension assembly of said axle/suspension system, said slidable connection of said second end of said damping means to said beam of said suspension assembly further comprises a pivotable and slidable connection.

\* \* \* \* \*